United States Patent [19]

Bauer

[11] 3,794,781

[45] Feb. 26, 1974

[54] FOUR CHANNEL DECODER WITH IMPROVED GAIN CONTROL

[75] Inventor: Benjamin B. Bauer, Stamford, Conn.

[73] Assignee: Columbia Broadcasting Systems, Inc., New York, N.Y.

[22] Filed: Sept. 1, 1971

[21] Appl. No.: 177,002

[52] U.S. Cl. .................... 179/1 GQ, 179/100.4 ST, 179/100.1 TD

[51] Int. Cl. .................... H04r 5/00

[58] Field of Search .............179/15 BT, 1 G, 1 GQ, 179/100.4 ST, 100.1 TD, 1 VL, 1 D; 333/28 T, 17

[56] References Cited

UNITED STATES PATENTS 3,708,631 1/1973 Gravereaux et al.............. 179/1 GQ 3,632,886 1/1972 Scheiber......................... 179/15 BT

OTHER PUBLICATIONS

4 Channels and Compatibility by Scheiber AES Preprint Oct. 1970 179-1 GQ

*Primary Examiner*—Kathleen H. Claffy
*Assistant Examiner*—Thomas D'Amico
*Attorney, Agent, or Firm*—Spencer E. Olson

[57] ABSTRACT

Apparatus including a matrix for decoding four separate channels of information transduced from a medium having only two separate tracks and presenting it on four loudspeakers to give the listener the illusion of sound coming from a corresponding number of separate sources. Side-effect or transferred signals between channels tend to diminish the realism of four-channel reproduction. The realism is enhanced by a decoding system which accepts the two outputs from the medium, which, for example, may be a stereophonic disc record, separates them into four independent channels each carrying predominantly the information contained in one of the four original recorded sound signals, and, utilizing logic circuit techniques derives control signals for controlling the gains of amplifiers associated with the four loudspeakers. The control circuitry improves the separation of the four independent channels, particularly the generally "front" from the generally "back" signals. To prevent the transferred back signals corresponding to a "center front" signal from being heard instantaneously in the back channels (and vice versa) a selective gating voltage is applied to the control circuitry which reduces the quiescent gain of the amplifiers during silence or very low level passages by a pre-selected amount, whereby upon sudden application of a signal to the decoder the gain of the amplifier carrying the desired signal is raised rapidly to a normal operating level only in those channels intended to carry the signal and thus the undesired side-effect signals are essentially eliminated.

5 Claims, 4 Drawing Figures

INVENTOR.
BENJAMIN B. BAUER
BY
Spencer E. Olson
ATTORNEY

INVENTOR.
BENJAMIN B. BAUER
BY Spencer E. Olson
ATTORNEY

FOUR CHANNEL DECODER WITH IMPROVED GAIN CONTROL

CROSS-REFERENCE TO OTHER APPLICATIONS

This invention is related to the subject matter of the following co-pending applications, all of which are assigned to the assignee of the present application: Ser. No. 44,224, filed June 8, 1970, now abandoned in favor of continuation application Ser. No. 251,544 filed Apr. 21, 1972, which in turn is abandoned and incorporated in continuation-in-part application Ser. No. 328,814 filed Mar. 10, 1973, also abandoned and incorporated in continuation-in-part application Ser. No. 384,334 filed July 31, 1973; Ser. No. 124,135, filed March 15, 1971; and Ser. No. 155,976, filed June 23, 1971.

BACKGROUND OF THE INVENTION

This invention relates to systems for recording four separate channels of information on a medium having only two independent tracks and apparatus for reproducing such information and presenting it on four loudspeakers to give the listener the illusion of sound coming from a corresponding number of separate sources. More particularly, the present invention is concerned with a decoder, especially logic circuitry for use therewith, for improving the realism of sound decoded from a matrixed quadraphonic record, recorded on a two-track medium in accordance with the method described in aforementioned co-pending applications Ser. No. 124,135 and 155,976.

Briefly, in a matrix quadraphonic record, four usually independent channels, $L_f$, $L_b$, $R_f$ and $R_b$, which are intended to be reproduced on respective loudspeakers positioned at the left front, left back, right front, and right back corners, respectively, of a room or listening area, are combined into two channels by a matrix encoder of the type illustrated in FIG. 8 of co-pending application Ser. No. 124,135, it being understood, however, that the decoder to be described herein is operative to produce signals encoded with encoders of other configurations, for example, the encoder described in co-pending application Ser. No. 384,334. The encoder produces two composite signals that can be recorded on a two-track medium such as magnetic tape or a disc record, utilizing conventional recording techniques. The two output channels, which for convenience will hereinafter be designated $R_T$ and $L_T$ (for total or transmitted right and left signal, respectively) may be recovered from a phonograph record with a conventional phonograph pickup, or alternatively, transmitted directly from the encoder and applied to a decoder which transforms them into four new signals, predominant components of which correspond to the original signals $L_f$, $L_b$, $R_f$ and $R_b$ accompanied by side-effect or transferred signals from two of the other original input signals, but at a lower level.

The composite signals appearing at the output of the encoder are portrayed as phasor groups 14 and 16 in FIG. 1A, which may be characterized in complex notation, as follows:

$$L_T = L_f + .707R_b - j.707L_b$$

and $$R_T = R_f - .707L_b + j.707R_b$$

It will be noted that $L_f$ and $R_f$ are in phase, that the .707$L_b$ component in the two composite signals are at right angles to each other and that .707$R_b$ signal components appearing in both composite signals are likewise in phase quadrature. In the interest of providing better realism of image placement when the record is played on a conventional stereophonic phonograph over two loudspeakers, it is preferable that the phasor .707$L_b$ in phasor group 16 lags the similarly numbered phasor in phasor group 14, and that the phasor .707$R_b$ in phasor group 14 lags the corresponding phasor in group 16.

Co-pending application Ser. No. 155,976 describes a system for decoding the signals $L_T$ and $R_T$, the principal elements of which are shown in FIGS. 1A and 1B and will now be described as background for an understanding of the objects and operation of the herein described invention. The output from the stereophonic pickup, or other source of encoded signals, namely, the composite signals $L_T$ and $R_T$, are respectively applied to terminals 10 and 12 of the decoder. These signals are respectively phase-shifted with pairs of $\psi$-networks 18 and 20 and 22 and 24 to position the phasors of the two signals relative to each other in a manner which favors selective addition and subtraction so as to derive four output signals, each containing a predominant component corresponding to one of the original input signals. To this end (and as more fully described in co-pending application Ser. No. 155,976) networks 18 and 24 each introduce a basic phase-shift angle, $\psi$, which is a function of frequency, and networks 20 and 22 introduce a phase-shift angle of $\psi$ plus substantially 90°, all the angles being usually reckoned in the lagging sense. By reason of the relative 90° phase-shift, the two phasor groups appearing at the outputs of the $\psi$-networks to which the $L_T$ signal is applied are in quadrature relationship, as are the two phasor groups appearing at the outputs of the $\psi$-networks to which the $R_T$ signal is applied. Thus, the phasors at the outputs of the four $\psi$-networks are properly positioned for selective addition and subtraction in summing junctions 26 and 28 to derive four separate output signals predominantly containing the original signals $L_f$, $L_b$, $R_b$ and $R_f$, respectively, depicted by phasor groups 54, 56, 58 and 60, respectively. These signals are separately amplified by gain control amplifiers 30, 32, 34 and 36 prior to application to respective loudspeakers 46, 48, 50 and 52.

It is essential to the operation of the present invention that the amplifiers be gain control amplifiers, the gains of which may be controlled by application of a variable control voltage $E_c$ to their respective control terminals 38, 40, 42 and 44. The function which expresses the variation in the amplification factor A of the amplifiers as a function of the control voltage $E_c$ is shown, by way of example, in FIG. 2. In the normal, or quiescent condition, that is, when there is no signal input to the decoder, the control voltage has a normal or quiescent value $E_q$ for which the amplification factor is approximately 70 percent. Thus, the gains of all four amplifiers are 20 log 0.7 = −3db from maximum. Therefore, any input signals into the decoder initially cause generation of signals at the loudspeakers 46, 48, 50 and 52 having relative amplitudes expressed by the phasor groups 54, 56, 58 and 60, respectively. Following a short interval after the application of such input signals, the gain of the gain-controlled amplifiers are controlled in a manner to be described hereinafter by a logic circuit which is operative to enhance the predominant signal relative to the side-effect signals. However, the logic is not instantaneous, and initial impression created by the first application of signal, before the logic has had a chance to operate, might create an erroneous illusion of direction of the decoded signals. For example, if a "center front" signal is applied to the decoder, for a brief instant after application the sound is heard also in the center back, and while the front-back logic promptly moves the sound to the front, the impression of the "back" sound lingers, resulting in an unpleasant side-effect.

More specifically, assume that a center front signal .707$C_f$ is applied to the input terminals 10 and 12 of the decoder. After action by the ψ-networks and combining junctions 26 and 28, the signal will appear as shown by the dotted phasors in phasor groups 54, 56, 58 and 60; that is, the central front signal appears in equal strengths in the four loudspeaker circuits and, therefore, at certain locations in the listening area, the listener will hear the signal in the back as well as in the front loudspeakers. Although the logic (to be described) rapidly applies the control voltage increase to the front loudspeakers, and equally rapidly diminishes the control voltage, and hence the amplification factor, of the amplifiers associated with the rear loudspeakers, the time constants of the gain control amplifiers are such as to allow a rapid increase in gain but to permit only a relatively slow diminution of gain. Thus, even with the rapid application of a reduced control voltage to amplifiers 32 and 34, the gain of these amplifiers reduces slowly, causing the undesired "back" signal to continue to be heard for an annoying small fraction of a second. It is a primary object of the present invention to improve the logic circuitry described in co-pending application Ser. No. 155,976 to reduce or substantially eliminate undesired "lingering" signals so as to obtain greater quadraphonic realism.

SUMMARY OF THE INVENTION

The foregoing and other objects of the invention are achieved by an improved logic for controlling the gains of the four output amplifiers of the decoder in response to signals appearing in the decoder to enhance the realism of the four-channel reproduction. The above-described shortcoming of the decoder of application Ser. No. 155,976 is solved by providing a gating voltage of such a value that during silent passages (or even low level passages) the quiescent point of the gain control amplifiers is driven to a lower than normal gain position. Thus, upon sudden application of a signal to the decoder, following a period of silence or a low level passage, the gains of all of the amplifiers are initially down by preselected amount, say 3 to 6 db below the normal quiescent point. The control signals at once supplied by the logic are such as to increase the gain of channels carrying the desired signals and further to diminish the gains of the amplifiers carrying the side-effect signals. Thus, while the amplifiers in the channels carrying the desired signals are, under this condition, raised rapidly to their maximum of 100 percent gain factor, the amplifiers in the channels carrying the undesired side-effect signals, since their gain factors are initially at a low level do not increase in their gain factor, and therefore, are unable, during the small fraction of a second that the side-effect signals would cause annoyance, to reach a gain level at which the side-effect signals can be heard. Thus, the annoyance of the side-effect signals which would otherwise be produced is eliminated, or at least greatly reduced.

BRIEF DESCRIPTION OF THE DRAWINGS

Other objects, features and advantages of the invention, and a better understanding of its construction and operation, will be had from the following detailed description, taken in conjunction with the accompanying drawings, in which.

DESCRIPTION OF THE PREFERRED EMBODIMENT

Figure 1B:
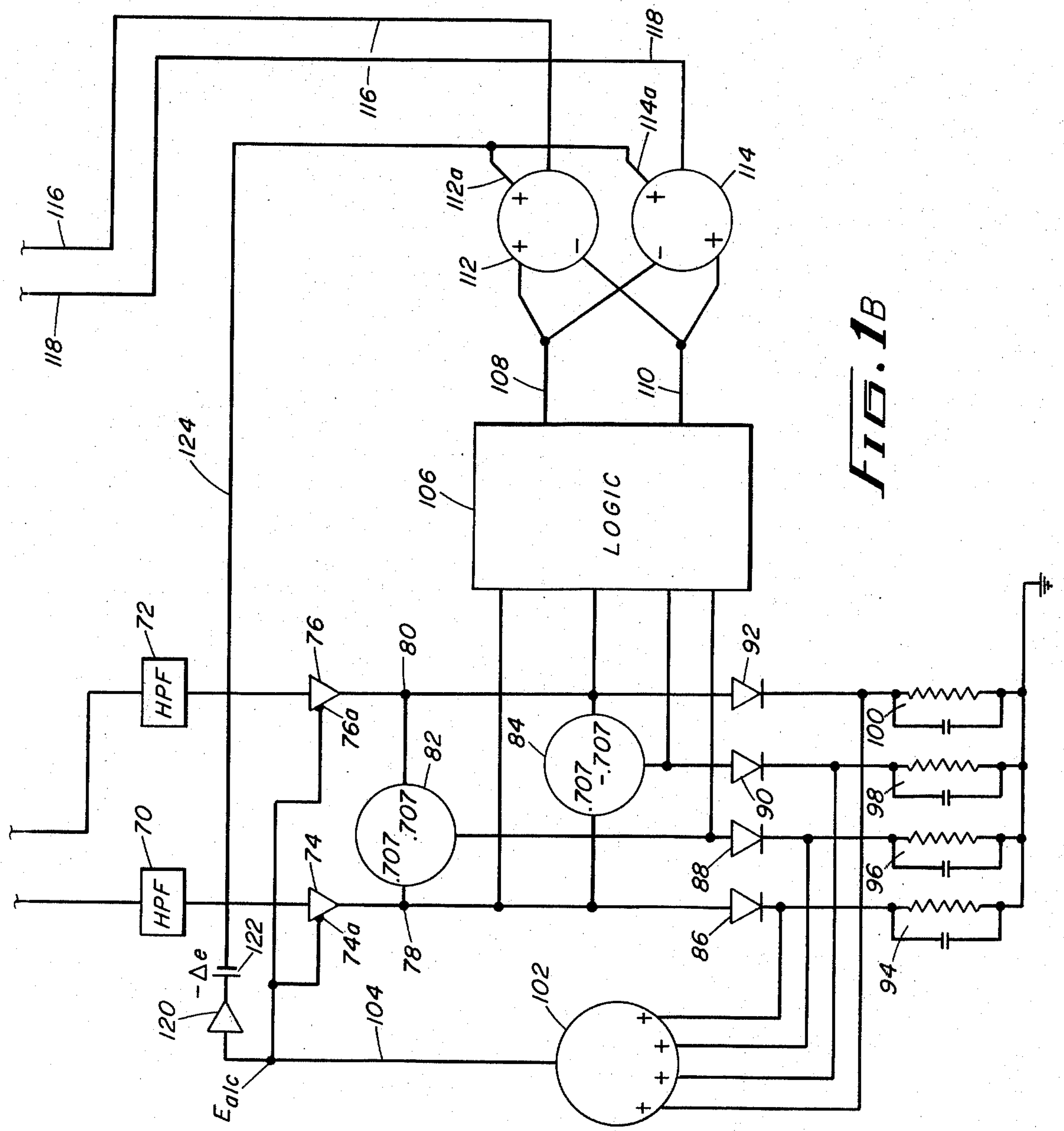

To better understand the principle of operation of the present invention, a simple form of logic, illustrated in FIG. 1B and described in detail in application Ser. No. 155,976, will now be described. The logic is operative to develop control signals for the gain control amplifiers by operating on two signals developed in the matrix, preferably the signals appearing at the outputs of ψ-networks 20 and 24, in a manner to insure that the signals to be operated upon by the logic are of relatively uniform amplitude regardless of the signal strength of the program being reproduced. The signals from ψ-networks 24 and 20 are first coupled through respective, substantially identical high-pass filters 70 and 72 designed to reject frequencies below about 50Hz—frequencies which normally should not be involved in the logic action. The transmission characteristic of the filters above the cutoff point is preferably adjusted so as to optimize the logic control action in accordance with the sensitivity of the ear to the loudness of various sounds. The signals delivered by the filters are applied to the input terminals of respective gain control amplifiers 74 and 76 having identical or closely similar gain versus control characteristics. It will be observed that the signals at the outputs of ψ-networks 20 and 24 are applied to amplifiers 76 and 74, respectively, whereby the applied signals are the $L_T$ and $R_T$ composite signals, corresponding components of which are shifted in phase relative to each other by 90°. This permits the signals delivered by the amplifiers to be added and subtracted to derive two new signals having properties advantageous to the desired performance of the logic. Specifically, .707 of each of the signals from amplifiers 74 and 76, appearing at terminals 78 and 80, respectively, are added in a summing junction 82 to produce at its output a new signal in which the component $L_b$ is predominant. Similarly, —.707 of the signal from amplifier 76 is added in another junction 84 to .707 of the signal from amplifier 74 to produce at its output terminal another new signal in which the component $R_b$ is predominant. At the same time, the predominant component of the signals appearing at terminals 78 and 80 are $R_f$ and $L_f$, respectively.

The four signals just described are rectified by respective rectifiers 86, 88, 90 and 92, which are preferably full-wave rectifiers, each of which includes a respective time-constant circuit 94, 96, 98 and 100, each designed to provide a rapid attack time of the order of about one millisecond, and a relatively slower decay time, of the order of about 20 milliseconds. The signals at the outputs of the four rectifiers, which correspond to the maximum values of the just-described four principal signals, are added together in a summing junction 102, and the sum signal is applied in parallel to the control electrodes 74*a* and 76*a* of gain control amplifiers 74 and 76. Application of the sum of the rectified signals in the illustrated feedback relationship automatically and simultaneously adjust the gains of the amplifiers in response to changes in the strength of the signals being processed, thereby to maintain the amplitude of the rectified signals essentially constant. It follows that the levels of the signals at terminals 78 and 80 and at the output terminals of junctions 82 and 84 also remain substantially constant, whereby the automatic level control voltage, $E_{alc}$, appearing on the feedback conductor 104 also remains reasonably constant.

Figure 1A:
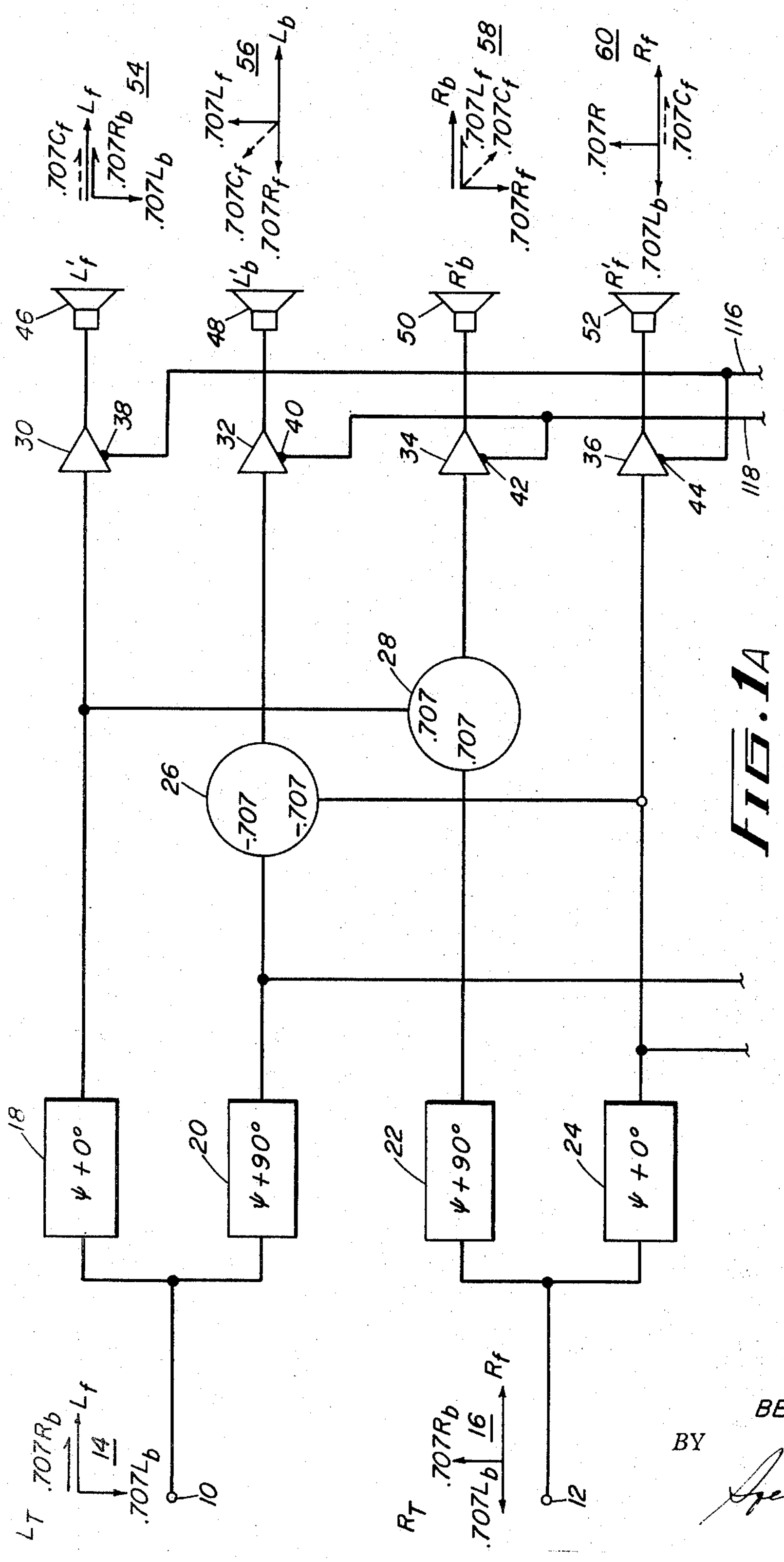
FIGS. 1A and 1B taken together is a schematic diagram of decoding apparatus embodying the invention.
Figure 3:
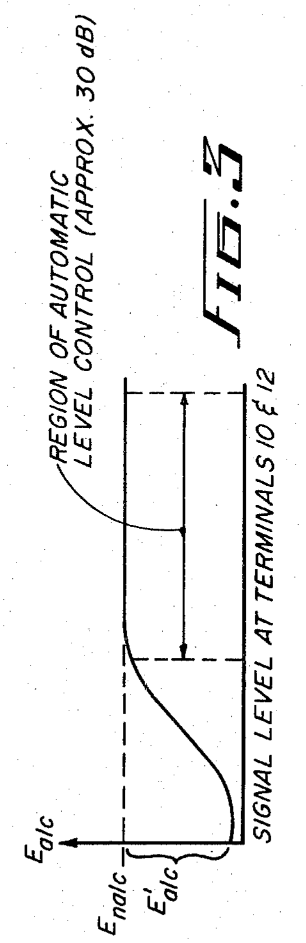
FIG. 3 is a plot of the gating voltage as a function of the level of input signals applied to the decoder.

The signals appearing at terminals 78 and 80 and at the output terminals of junctions 82 and 84 are applied to a logic combining network 106 (described in detail in the aforementioned co-pending application Ser. No. 155,976) which is designed to operate with signals which vary in relative amplitudes among them, but which in the aggregate have substantially constant overall levels. Thus, the just-described level control circuit insures proper operation of the logic regardless of the strength of the signals applied to the input terminals 10 and 12, over a reasonable range of signal level, of the order of 30db. This action is illustrated in FIG. 3 in which the ordinate of the plot is the control voltage $E_{alc}$ on the conductor 104 and the abscissa is the signal level into the terminals 10 and 12. It is seen that over a large region of normal input signal levels, the voltage $E_{alc}$ remains substantially constant at, or increases slightly from, a value $E_{nalc}$, whereas when there is no input, or when the level of the input signal is very low, the voltage $E_{alc}$ is reduced to a value falling in the region labeled $E'_{alc}$.

Figure 2:
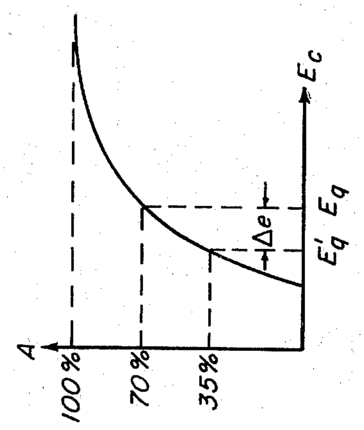
FIG. 2, to which reference has already been made, is a plot of the amplification factor versus control voltage characteristic of the gain control amplifiers of the decoder of FIG. 1A.

The logic circuit 106 utilizes a wave-matching technique in the manner described in the application Ser. No. 155,976 to produce at its output terminals 108 and 110 a set of voltages in response to the input signals into the decoder. The output voltage at terminal 110, which corresponds to the signal appearing at the output of the time-constant circuit 170 in FIG. 2B of application Ser. No. 155,976, is subtracted in a combining junction 112 from the voltage appearing at output terminal 108, which corresponds to the signal appearing at the output of the time-constant circuit 168 in said FIG. 2B, and the signal appearing at terminal 108 is subtracted in combining junction 114 from the signal appearing at output terminal 110. The output of junction 112 is applied over conductor 116 to the control elements 38 and 44 of the "front" gain control amplifiers 30 and 36, respectively, and the output from combining junction 114 is applied over conductor 118 to the gain control elements 40 and 42 of the "back" amplifiers 32 and 34. As described earlier, when there are no input signals into the decoder the signals on conductor 116 and 118 are at a level to maintain the voltage of the control elements 38–44 at the quiescent position designated $E_q$ in FIG. 2.

In accordance with the invention, an amplifier 120 is connected to the output of summing junction 102, the gain of which is such that when the voltage $E_{alc}$ is at its normal operating value, $E_{nalc}$, the voltage at the output of the amplifier is numerically equal to $\Delta e$, the value of which will be described later. When the voltage $E_{alc}$ drops to a value in the region $E'_{alc}$ (FIG. 3), which happens when the level of the signal applied to terminals 10 and 12 are below a critical value, or zero, the output of amplifier 120 approaches zero. At the output of amplifier 120 there is provided a source of negative potential, such as a battery 122, which places in series with the amplifier a negative voltage equal to the aforementioned $\Delta e$. The total voltage delivered by the amplifier and battery is applied over conductor 124 to the combining junctions 112 and 114 in an additive sense via terminals 112*a* and 114*a*, respectively. Thus, the control signals delivered at the output terminals of junctions 112 and 114 each contain a contribution from amplifier 120 and potential source 122.

When there is no input into terminals 10 and 12 the quiescent control voltage $E_c$ applied to the control elements of gain control amplifiers 30, 32, 34 and 36 is driven down from the normal quiescent level $E_q$ to the value $E'_q$, which differs from $E_q$ by the amount $\Delta e$. To achieve the purposes of the invention, the voltage $\Delta e$ has a value so as to reduce the gain of amplifiers 30, 32, 34 and 40 by a predetermined amount, say 6db, below the amplification factor they would have at the normal quiescent control voltage $E_q$ and signals of normal level applied to the terminals 10 and 12. The moment normal level signals are applied to input terminals 10 and 12 the voltage at the output of amplifier 120 rapidly becomes equal to $\Delta e$, thus cancelling the effect of the negative potential $\Delta e$ supplied by source 122, and thereby allowing the amplifier control voltage $E_c$ to return to its normal quiescent value $E_q$. At the same time, and with equal rapidity, control signals are applied by the logic 106 to the junctions 112 and 114 so as to cause respective increases and decreases in the control voltages delivered at the output terminals of junctions 112 and 114, which therefore are operative from a starting control voltage $E'_q$, and not $E_q$.

To summarize, when no signals are applied to the input terminals of the decoder, the gains of the gain control amplifiers are automatically reduced by a predetermined level, for example, 6db, so that if a frontal signal $C_f$, previously described, is suddenly applied to the input terminals, the signal, which, as was noted earlier, would otherwise appear at all four loudspeakers, are initially all diminished by the said 6db level with the consequence that they are initially attenuated at the outputs of all the loudspeakers. The action of the logic (FIG. 1B) almost immediately produces a control signal at the output of junction 112 which rapidly raises the gain of the "front" amplifiers 30 and 36 to their maximum value, while allowing the gains of the "back" amplifiers 32 and 34 carrying the undesired signals to fall (slowly, because of the nature of the time constant of the gain control amplifiers), but from a level which is 6db lower than it would be without the present invention. Thus, the deleterious effect of side-effect signals, particularly those attendant the sudden application of certain kinds of signals following periods of low level or no signal input to the decoder, is greatly reduced. The described modification to the decoder has the further advantage of reducing background noise, tape hiss, etc. that may be present in the signals applied to the decoder. In the form herein described, the invention also functions to diminish the deleterious effect of the undesired signals at the "front" loudspeakers with the sudden application of signals intended to be reproduced at the "back" loudspeakers.

Although a preferred embodiment of the invention has been illustrated and described, various modifications will now be suggested to ones skilled in the art. For example, although a particular value has been suggested for the potential, $\Delta e$, and a particular diminution of 6db below the normal quiescent gain has been suggested, it will be understood that these are by way of example only and should not be interpreted as limiting and the invention includes the case when the gain diminution is carried out to the cutoff point. Also, although the outputs of rectifiers 86, 88, 90 and 92 are summed in summing junction 102, the rectifier outputs can alternatively be connected together and provided with a single time-constant circuit to provide thereacross the maximum of the four signals applied to the rectifiers, without affecting the principle of operation of the invention. Similarly the action can be altered in such manner that different values of $\Delta e$ are applied to the individual amplifier pairs 30 and 36 and 32 and 34.

I claim:

1. Signal-decoding apparatus comprising, in combination:

a decoder matrix for translating first and second composite signals respectively containing dominant left front ($L_f$) and right front ($R_f$) signal components and each including sub-dominant left back ($L_b$) and right back ($R_b$) signal components, said signal components $L_b$ and $R_b$ in said first composite signal being in substantially quadrature relationship with the corresponding signal components in said second composite signal, into first, second, third and fourth separate output signals respectively predominantly containing the $L_f$, $R_f$, $L_b$ and $R_b$ signal components, the dominant $L_f$ and $R_f$ signal components at the output of the decoding matrix each being accompanied by lower-amplitude quadrature-related $L_b$ and $R_b$ signal components and the dominant $L_b$ and $R_b$ signal components each being accompanied by lower-amplitude quadrature-related $L_f$ and $R_f$ signal components;

first, second, third and fourth gain-control amplifiers respectively connected to receive the said first, second, third and fourth output signals from said decoder matrix, each of said amplifiers being normally operative at a gain factor less than the maximum gain of the amplifier and having a time constant such that it responds more rapidly to application of a gain-increasing control signal than to a gain-decreasing control signal;

a logic circuit connected to said decoder matrix and operative to determine whether a front or back signal is instantaneously predominant in the first and second composite signals and connected to apply a gain-increasing control signal to the first and second gain control amplifiers when a front signal is instantaneously predominant or to the third and fourth gain control amplifiers when a back signal is instantaneously predominant to increase their gains above the said normal gain factor; and circuit means including a source of potential operative when the amplitudes of said first and second composite signals are below a predetermined level to reduce the gains of the gain-control amplifiers below the said normal gain factor.

2. Apparatus in accordance with claim 1, including means for deriving from the first and second composite signals a control voltage having a first substantially constant amplitude, regardless of changes of level in the first and second composite signals, over a predetermined range of levels of the composite signals, and to produce a control voltage of a second lower amplitude over a range of levels of the composite signals below the predetermined range of levels, and wherein the means for reducing the gains of the gain-control amplifiers includes a source of potential opposite in polarity to the said control voltage and substantially of the said first amplitude and so connected as to oppose and substantially cancel the said control voltage when the latter has the said first amplitude and applying a resultant gain-decreasing voltage to the four gain-control amplifiers when the said control voltage is of the said lower amplitude.

3. Apparatus in accordance with claim 2, wherein the means for deriving the said control voltage includes first and second auxiliary gain-control amplifiers, a pair of signal-combining networks each connected to receive output signals from the first and second auxiliary gain-control amplifiers and respectively operative to produce sum and difference signals, means for rectifying the signals from the auxiliary gain control amplifiers and the said sum and difference signals, and means for combining the output signals from said rectifiers to produce said control voltage.

4. Apparatus in accordance with claim 3, wherein said logic circuit is connected to receive as input signals the outputs of said auxiliary gain control amplifiers and the said sum and difference signals from said signal-combining circuits and is operative to compare these signals.

5. Apparatus in accordance with claim 2 wherein the gain factor of said gain control amplifiers is reduced from its normal value by approximately 6db in response to the application thereto of the said gain-decreasing voltage.

* * * * *